April 15, 1930.　　J. J. O. RULIANCICH　　1,754,528
POWER TRANSMISSION APPARATUS
Filed Nov. 7, 1924　　6 Sheets-Sheet 1

April 15, 1930. J. J. O. RULIANCICH 1,754,528
POWER TRANSMISSION APPARATUS
Filed Nov. 7, 1924 6 Sheets-Sheet 5
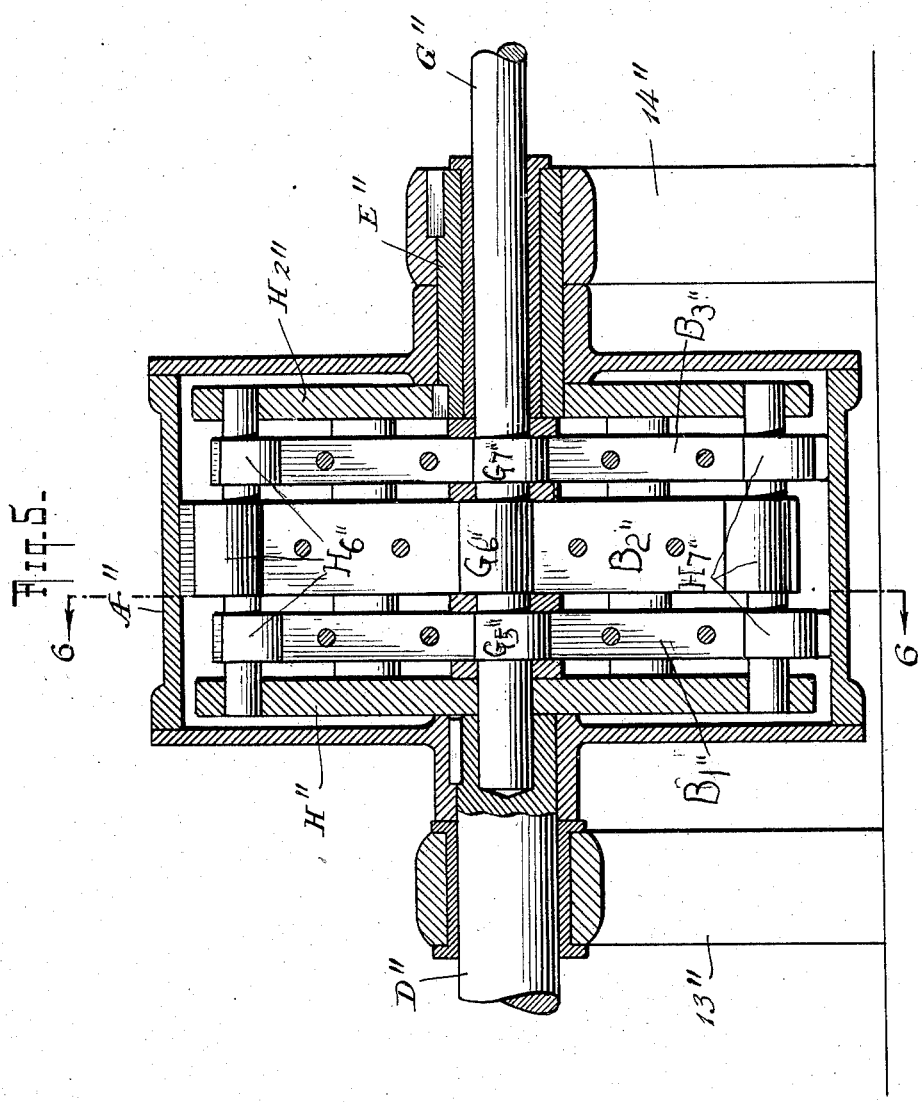

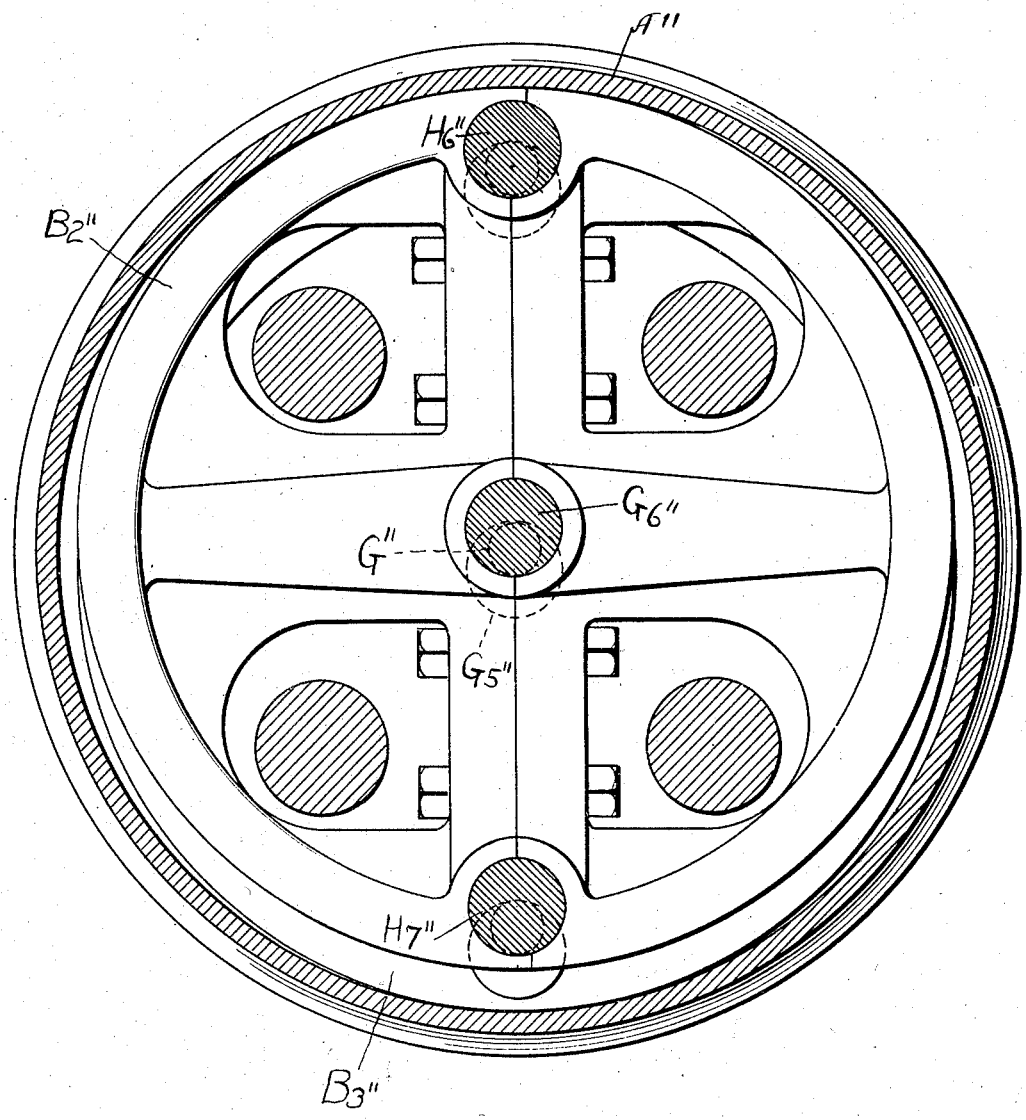

Patented Apr. 15, 1930

1,754,528

UNITED STATES PATENT OFFICE

JOHN J. O. RULIANCICH, OF NEW KENSINGTON, PENNSYLVANIA

POWER-TRANSMISSION APPARATUS

Application filed November 7, 1924. Serial No. 748,452.

This invention relates to power transmission apparatus and aims to provide a simple transmission by means of which a reduction of speed and increase of torque may be obtained with a minimum loss of power.

In carrying out the invention separate means are provided for constraining or utilizing the revolutionary and rotational movements of the inner one of a pair of cooperating inner and outer gears. In this way the reduction in speed and increase in torque is made proportional to the ratio between the diameter of one of the gears and the difference between the diameters of the two gears. The transmission is, therefore, of especial value in cases where a very larg reduction is required, for in such a case the cooperating gears are of nearly the same diameter and have large cooperating surfaces in contact with each other which enable them to transmit a high torque without material loss. An important advantage of the invention lies in the fact that the cooperating surfaces of the gears are so large that a positive drive may be secured with the use of toothless or friction-type gears. This, of course, greatly reduces the expense of constructing the transmission.

A further feature of the invention consists in utilizing centrifugal force to urge the cooperating surfaces of the gears together and in constructing the inner gear in a plurality of balanced parts so that the centrifugal force does not cause unbalanced strains on the bearings of the apparatus. This use of centrifugal force is of great value in making possible the use of toothless gears.

A further feature of the invention consists in a system of clutches for locking together or locking stationary different parts of the transmission so as to make possible a direct drive without reduction, a forward drive with reduction, a reverse drive with reduction, and a free position. While the clutch system is of value in many uses of the transmission, the invention includes also a transmission without clutches for use as reduction gearing.

In order to make plain the nature of the invention, I will describe the three embodiments of it which are shown in the accompanying drawings, in which Fig. 1 is an axial section of a complete transmission containing toothless or friction gears, showing the clutches positioned for a forward reduced drive;

Fig. 5 is an axial section of a transmission with toothless gears and without clutches, arranged for a high degree of reduction; and Fig. 6 is a transverse section on the line 6—6 of Fig. 5.

Figure 1:
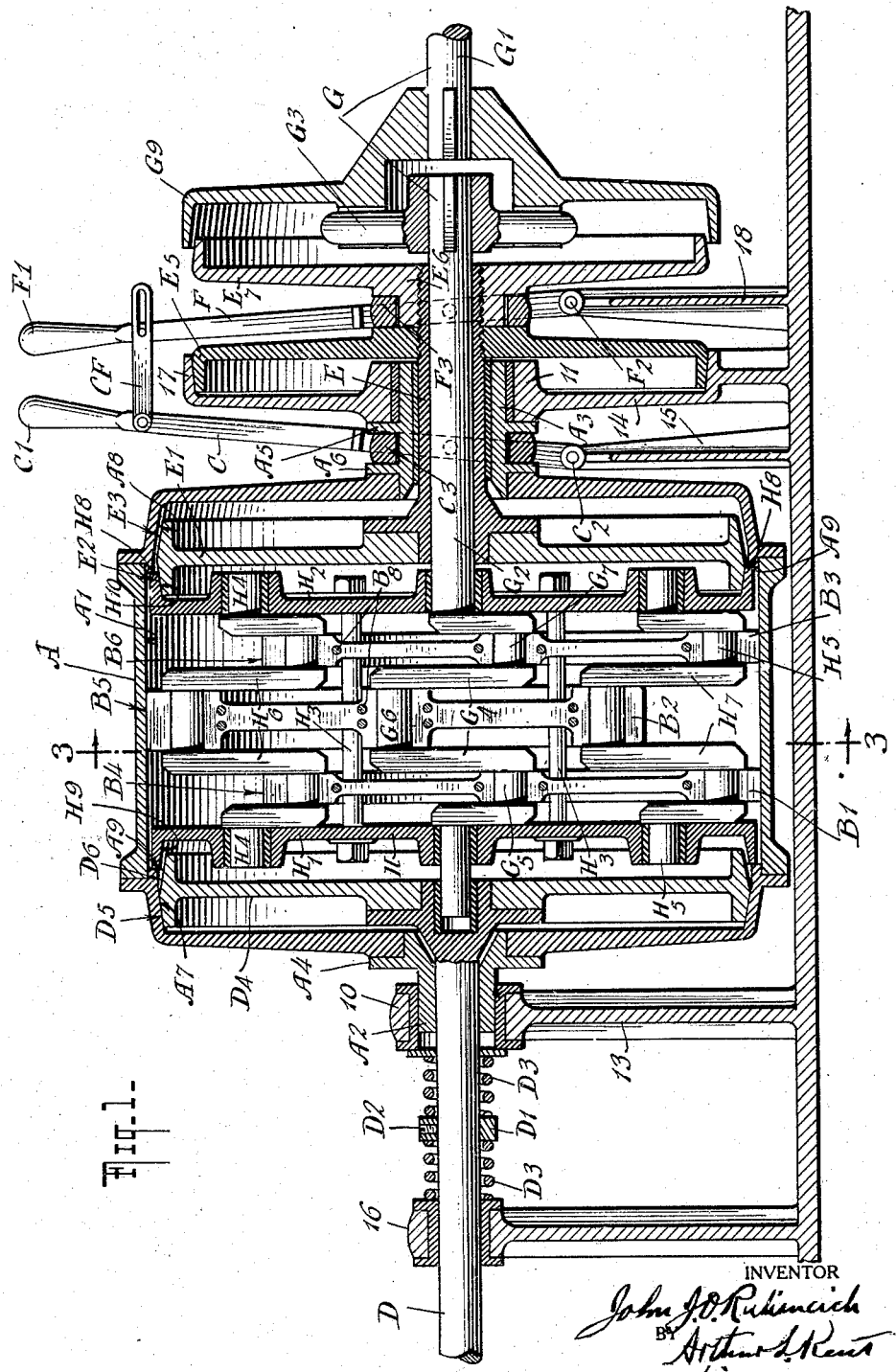
Figure 2:
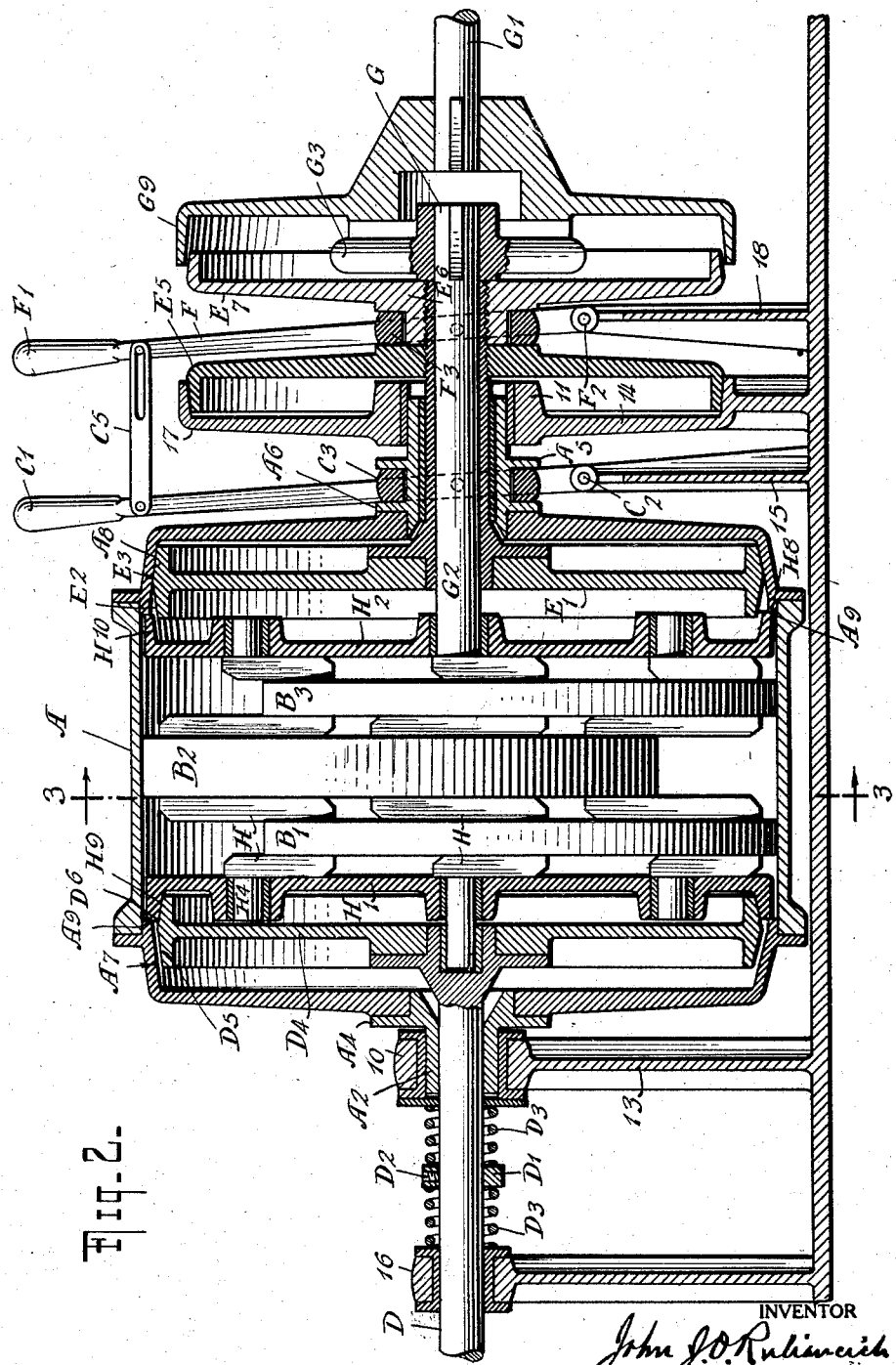
Fig. 2 is a similar view except that the inner gears are not sectioned and the clutches are positioned for a reversed reduced drive.
Figure 3:
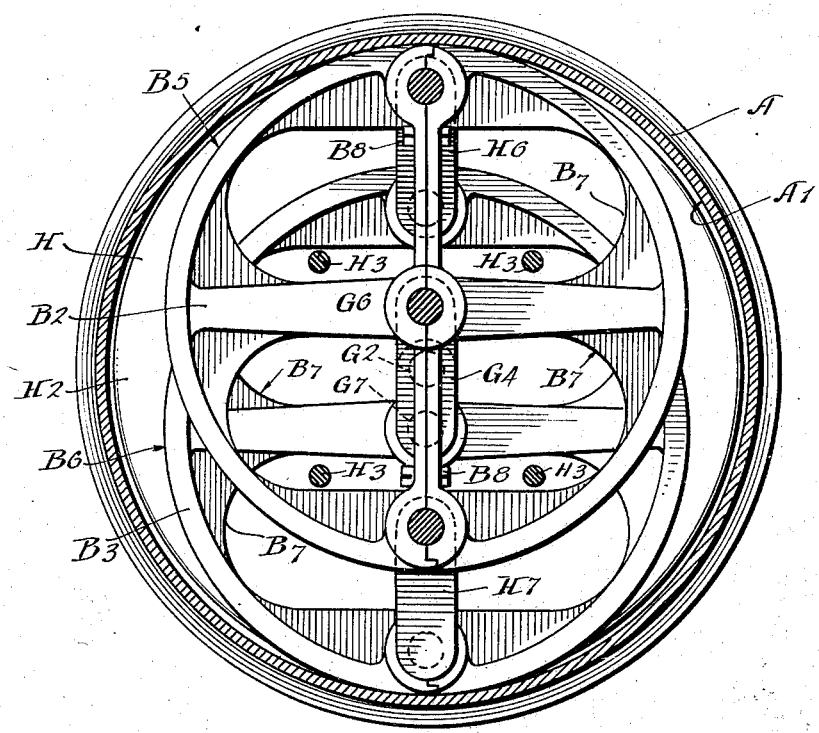
Fig. 3 is a transverse section on the lines 3—3 of Fig. 1 and Fig. 2.

The transmission shown in Figs. 1 to 3 includes a drum or outer gear A having a toothless internal cylindrical gear surface $A^1$ and three cooperating inner gears or friction wheels $B^1$, $B^2$, $B^3$ which have smooth peripheral gear surfaces $B^4$, $B^5$, $B^6$ in contact with the gear surface $A^1$ of the outer gear A. The diameters of the gear surfaces of the three inner gears $B^1$, $B^2$, $B^3$ are the same, and are less than the diameter of the friction surface of the gear surface $A^1$ of the outer gear or drum A.

The outer gear or drum A has at its ends hollow axial trunnions $A^2$, $A^3$ which are rotatably and slidably mounted in fixed bearings 10 and 11 carried on standards 13, 14, forming part of the framework of the transmission. Axial movement of the drum A in one direction is limited by engagement of a flange $A^4$ on the trunnion $A^2$ with the bearing 10 and axial movement in the other direction is limited by the engagement of a flange $A^5$ on the trunnion $A^3$ with the fixed bearing 11. A lever C having a handle $C^1$ is provided for moving the drum A axially between these limits. The lever C is pivoted at $C^2$ to a fixed standard 15 and is connected with a ring $C^3$ mounted on the trunnion $A^3$ between the flange $A^5$ and a flange $A^6$.

The driven shaft D of the transmission is coaxial with the drum A and is journaled in a fixed bearing 16 and in the trunnion $A^2$ of the drum A. The shaft D is resiliently held against longitudinal movement by means of a collar $D^1$ adjustably fixed thereon by a set screw $D^2$ and a pair of springs $D^3$ reacting against this collar and the fixed bearings 10 and 16. Fixed on the inner end of the shaft D which projects within the drum A is a clutch member $D^4$ having two conical friction surfaces $D^5$, $D^6$ of which the surface $D^5$ engages an internal conical surface $A^7$ on the drum A and locks the drum A to the driven shaft D when the lever C is moved to the right, as shown in Fig. 1.

On a hollow shaft E, which extends through the trunnion $A^3$ of the drum and is slidably and rotatably mounted therein, is fixed a second clutch member $E^1$ located within the drum. This clutch member has two conical friction surfaces $E^2$, $E^3$, of which the surface $E^3$ is adapted to cooperate with the internal conical surface $A^8$ formed on the drum A. The shaft E carries another clutch member $E^5$ adapted to engage a fixed clutch member 17 mounted on the standard 14 and forming part of the support for the fixed bearing 11. Axial movements for engaging or disengaging the clutch members $E^5$ and 17 may be given the shaft E by means of a lever F having a handle $F^1$. The lever F is pivoted at $F^2$ to a fixed standard 18 and is connected with a ring $F^3$ mounted on a hub $E^6$ fixed on the outer end of the shaft E. When the lever F is moved to the left, as shown in Figs. 1 and 2, so as to bring the clutch member $E^5$ into engagement with the fixed clutch member 17, and the lever C is moved to the left as shown in Fig. 2 so as to bring the friction surface $A^8$ of the drum into contact with the friction surface $E^3$ of the clutch member $E^1$, the drum A is locked against rotation.

The driving shaft G of the transmission is coaxial with the drum A and the drive shaft D, and consists of two parts $G^1$, $G^2$. The part $G^1$ is mounted in fixed bearings not shown in the drawings and is held against axial movement therein. The shaft $G^2$ is journaled in the hollow shaft E and in an axial bearing provided in the clutch member $D^4$. The shaft $G^2$ is held against axial movement with respect to the drum A by means hereinafter described. In order to permit it to move axially with the drum A it has a spline driving connection $G^3$ with the shaft $G^1$. The shaft $G^2$ is provided with a triple crank $G^4$ on the three crank pins $G^5$, $G^6$, $G^7$ of which are mounted the three inner gears $B^1$, $B^2$, $B^3$. The throw of each of the three crank pins is equal to the difference between the radius of the gear surface $A^1$ of the outer gear A and the radius of the gear surfaces $B^4$, $B^5$, $B^6$ of the inner gears $B^1$, $B^2$, $B^3$. Consequently, rotation of the driving shaft G gives to each of the inner gears a revolutional movement about the axis of the gear A and in such movement the gear surfaces of the inner gears are always in contact with the internal gear surface of the outer gear. The outer gear, therefore, serves as constraining member for the inner gears.

Another constraining member H is so connected with the inner gears as to prevent rotational movements thereof with respect to it, while permitting free revolutionary movements thereof about the axis of the drum. In the form shown, the constraining member H consists of a cage formed of two discs $H^1$, $H^2$ journaled on the driving shaft $G^2$, and connected together by rods $H^3$ which pass through openings $B^7$ in the inner gears $B^1$, $B^2$, $B^3$ which are of sufficient size to permit revolutionary movements of the inner gears without bringing them into contact with these rods.

The connection between the constraining member or cage H and the inner gears consists of two stub shafts $H^4$, $H^5$ journaled at diametrically opposite points of the two discs $H^1$, $H^2$ and provided with triple cranks $H^6$, $H^7$ similar in dimensions to the triple crank $G^4$ of the drive shaft. Each of the inner gears $B^1$, $B^2$, $B^3$ is journaled at two diametrically opposite points on the corresponding crank pins of the triple cranks $H^6$, $H^7$. In order to facilitate the assembly of the three inner gears about the three crank pins on which each of them is mounted, each of the gears is made in two sections which are secured together by bolts $B^8$. The connection between the inner gears and the constraining member H provided by the stub shafts $H^4$, $H^5$ with their triple cranks $H^6$, $H^7$ permits free revolutionary movement of the three inner gears, since the stub shafts $H^4$, $H^5$ are free to rotate when the drive shaft D is rotated, but serves to prevent any rotational movement of the inner gears with respect to the constraining member or cage H.

The constraining member H is held against longitudinal movement on the driving shaft $G^2$ by engagement of the inner axial portions of its discs $H^1$, $H^2$ with the outer sides of the triple crank $G^4$, and is held against longitudinal movement with respect to the drum A by the engagement of the surfaces $H^8$ near the outer edge of its discs $H^1$, $H^2$ with internal projections $A^9$ on the drum A. The constraining member H thus serves to prevent relative longitudinal movement of the shaft $G^2$ and the drum A.

The discs $H^1$, $H^2$ of the cage H are provided respectively with conical friction surfaces $H^9$, $H^{10}$ adapted to cooperate with the friction surfaces $D^6$ and $E^2$ of the clutch members $D^4$ and $E^1$. When the lever F is positioned to keep the clutch $E^5$ and the fixed clutch 17 in engagement, as shown in Figs. 1 and 2, and the lever C is moved to the right, as shown in Fig. 1, the friction surface $H^{10}$ of the cage H is brought into contact with the friction surface E² of the clutch member E¹ so that the cage H is locked against rotation and the inner gears B¹, B², B³ are compelled to revolve about the axis of the drum without rotation on their own axes. When, without moving the lever F, the lever C is moved to the left, as shown in Fig. 2, the friction surface H⁹ of the cage H is brought into contact with the friction surface D⁶ of the clutch member D⁴ so that the cage H is locked to the driven shaft D.

In order to provide for a direct drive without reduction, cooperating clutch members G⁹ and E⁷ are fixed on the shafts G¹ and E respectively, and are so positioned that they are brought into engagement with each other when the lever F is moved to the right so as to move the clutch member E⁵ out of engagement with the fixed clutch member 17. To facilitate placing the apparatus in direct drive position, the levers C and F are connected by a slotted link CF which causes the lever C to move to the right when the lever F is going to the right.

The operation of the transmission which has been described is as follows:—When a direct drive between the driving shaft D¹ and the driven shaft D is desired, the lever F is moved to the right, drawing the lever C to the right. In such position of the two levers, the shaft E, the drum A, and the cage H are so placed that the clutch members G⁹ and E⁷ are in engagement, the clutch member E⁵ is free from the clutch member 17, the friction surface A⁸ of the drum is in engagement with the friction surface E³ of the clutch member E¹, and the friction surface A⁷ of the drum is in contact with the friction surface D⁵ of the clutch member D⁴. This locks together the shaft G¹, the shaft E, the drum A and the driven shaft D, so that the whole apparatus rotates as a unit.

When a forward drive with a reduction of speed and corresponding increase of torque is desired, the lever F is moved to the left, while the lever C is retained at the right-hand end of its movement, as shown in Fig. 1. In this position of the levers, the cage H is held against rotation while the drum A is locked to the driven shaft D. The rotation of the driving shaft G¹, G² causes the inner gears B¹, B², B³ to revolve with their gear surfaces in engagement with the gear surface A¹ of the outer gear A. As the inner gears are held against rotation by the cage H, their engagement with the outer gear causes the outer gear and the driven shaft D to rotate in a forward direction at reduced speed. The ratio between the speeds of the driving and driven shafts in this case is equal to the radius of the gear surface A¹ divided between the difference between the radius of the gear surface A¹ and the radius of the gear surfaces B⁴, B⁵ and B⁶.

When a reverse drive with reduction of speed is desired both the levers C and F are moved to the left, as shown in Fig. 2. This locks the drum or outer gear A against rotation and locks the cage H to the driven shaft D. The revolutionary movement imparted to the inner gears by the driving shaft G¹, G² while their peripheral gear surfaces travel over the fixed gear surface A¹ causes the inner gears to rotate slowly backwards about their axes. The rotational movement of the inner gears is transmitted to the cage H and thence to the driven shaft D. In this case the ratio between the speeds of rotation of the driving shaft and the driven shaft is equal to the radius of the gear surfaces of the inner gears divided by the difference between the radius of the gear surfaces of the outer and inner gears.

In the positions of forward and rearward reductions, the centrifugal force of the inner gears caused by their revolutionary movement about the axis of the outer gear tends to throw each of these three gears outward. Sufficient clearance is allowed in the bearings of the gears on the crank pins to permit this centrifugal force to bring the peripheral gear surface of each inner gear firmly against the internal gear surface of the outer gear, so that slippage between the gear surfaces is avoided. It should be noted that as the speed and power applied to the driving shaft is increased, the centrifugal force of the inner gears is also increased, so that this force which serves to lock the cooperating gear surfaces together becomes greater when an increased load is applied.

The masses of the gears B¹ and B³ are equal, while that of the middle gear is twice as great as the mass of either of the other two. Consequently, since the crank pin G⁶ is set at 180° from the crank pins G⁵ and G⁷, the centrifugal forces of the three gears are balanced so that, notwithstanding their eccentric position, they cause no unbalanced load on the bearings of the shaft G², nor on the bearings of the drum A.

Figure 4:
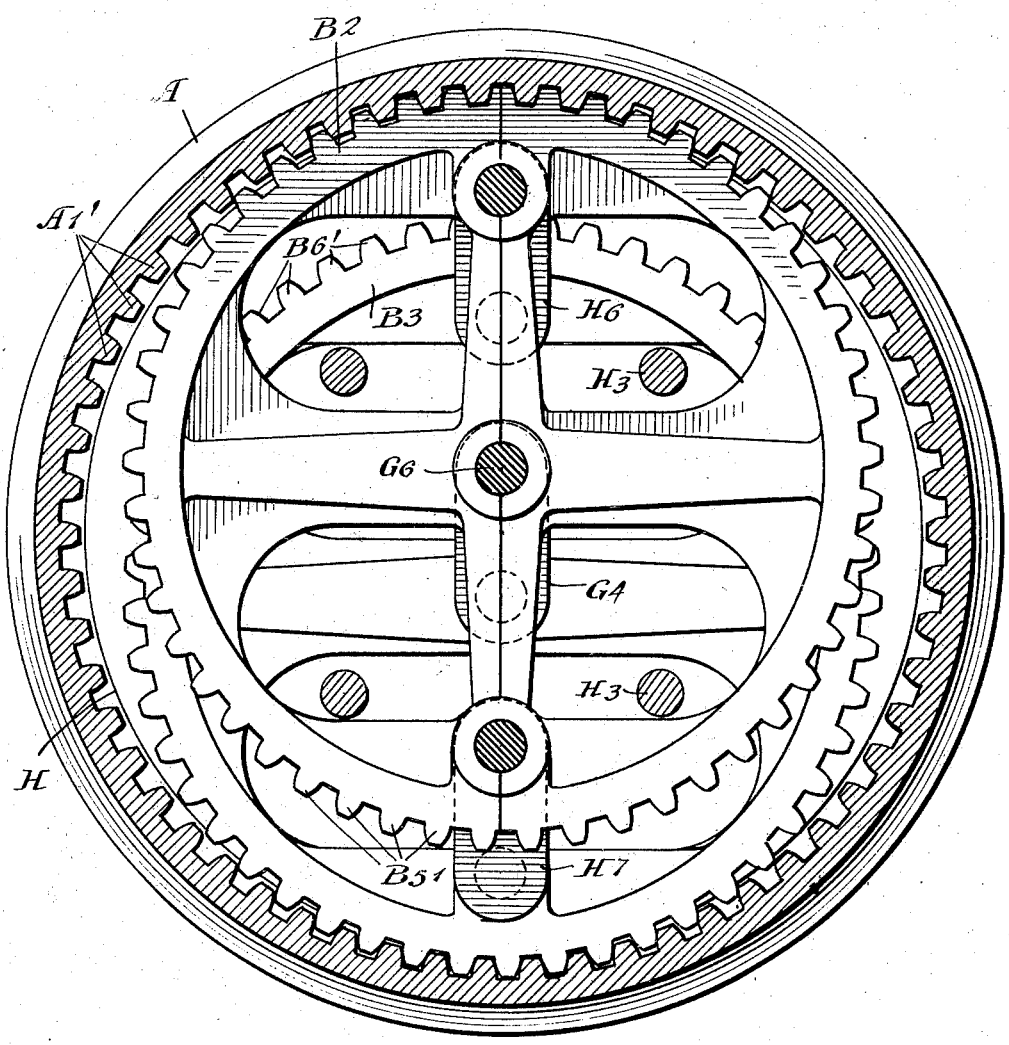
Fig. 4 is a transverse section similar to Fig. 3 showing the use of toothed gears in a transmission such as is shown in Figs. 1 to 3.

Although, because of the centrifugal force and the large contact areas of the gear surfaces, toothless gears are ordinarily satisfactory in this transmission. It is under some circumstances desirable to provide both the inner gears and the outer gear with ordinary gear teeth. A transmission with toothed gears is shown in Fig. 4. It differs from that which has been described only in that the gear surface A¹ of the outer gear or drum A and the gear surfaces B⁴, B⁵, B⁶ of the inner gears B¹, B², B³ are replaced by gear teeth A¹′, B⁴′, B⁵′ and a similar set of gear teeth on the third inner gear which is not shown in Fig. 4.

In the transmission which has been described, the ratio between the radii of the inner and outer gears is 4 to 5 so that when the clutches are positioned for forward reduction the reduction is in a ratio of 5 to 1, and when positioned for backward reduction, the reduction is in a ratio of 4 to 1.

Figs. 5 and 6 show a transmission in which the ratio between the radii of the inner and outer gears is 27 to 28, so that a reduction of 28 to 1 may be obtained in forward drive. This transmission is in general similar to those which have already been described, except that it is arranged for use as reducing gear apparatus only, and is, therefore, not provided with clutches. The constraining member or cage H'' has its discs H²'' mounted directly on and keyed to a fixed hollow shaft E'' secured in a fixed standard 14''. The drum A'' has on one end a bearing on the outer surface of the fixed shaft E'', while its other end is mounted directly on and keyed to the driven shaft D'' which contains at its inner end a bearing for the inner end of the driving shaft G''. The three triple cranks on which the three inner gears B¹'', B²'', B³'' are mounted take the form of triple eccentrics G⁵'', G⁶'', G⁷'', H⁶'', H⁷''. The construction and arrangement of the working parts of the apparatus are similar to those in the modification already described, and the operation is similar to that of the first modification when its clutches are positioned for a forward reduced drive.

For the purposes of the present invention, cranks having the form customarily termed "eccentrics", such as those shown in Figs. 5 and 6, are equivalent to cranks of the conventional form shown in the other figures, and the word "crank" as used in the claims should, therefore, be understood to comprehend these two equivalent constructions.

What I claim is:

1. A transmission apparatus, comprising aligned driving and driven shafts, a crank on the driving shaft, an inner gear mounted on said crank, a drum coaxial with said shafts enclosing said inner gear and providing an internal gear surface co-operating therewith, a constraining member rotatably mounted on the driving shaft within said drum, stub shafts on said constraining member, cranks connecting said stub shafts with the inner gear and having the same throw as the first-mentioned crank, a clutch member fixed on the driven shaft located within the drum and adapted to engage the drum and the constraining member alternately, a second clutch member located within the drum and adapted to engage the drum and the constraining member alternately, means located outside the drum for operating said clutch members, and releasable means located outside the drum for locking said second clutch member against rotation.

2. In a transmission apparatus, the combination of a driving shaft, a triple crank on said driving shaft having its two outer crank pins at an angle of 180° to its middle crank pin, two inner gears of equal mass mounted on the two outer crank pins respectively, a third inner gear having a mass equal to the sum of the masses of the other two gears mounted on the middle crank pin, said three inner gears being of equal diameter, and an outer gear coaxial with the driving shaft and having a gear surface engaging the peripheral surface of the three inner gears.

3. Apparatus as defined in the preceding claim in which the three inner gears and the outer gear have cooperating friction surfaces and in which there is sufficient play in the mounting of the inner gears to permit these gears to be thrown outwardly against the outer gear by centrifugal force.

4. In a transmission apparatus, the combination of two spaced members, a plurality of shafts extending between said members, a crank on each of said shafts, all of said cranks having the same throw, and a gear located between said members and mounted on said cranks for bodily revolution.

5. In a transmission apparatus, a driving shaft, a crank mounted on said driving shaft, two members located at opposite sides of said crank, a stub shaft extending between said members, a crank on said stub shaft having the same throw as the crank on the driving shaft, and a gear mounted at its center on the crank of the driving shaft and at a point spaced from its center on the crank of the stub shaft.

6. In a transmission apparatus, the combination of a cage having side members and tie members connecting the side members, a plurality of shafts extending between the side members of the cage and journalled in each of them, a crank on each of said shafts, all said cranks having the same throw, and a gear mounted on said cranks for bodily revolution and containing openings of sufficient size to permit the passage of the tie members of the cage in all positions of the gear during such revolution.

7. In a transmission apparatus, the combination of a driving shaft, a crank on said driving shaft, a cage having side members at opposite sides of said crank and tie members connecting its side members, a stub shaft extending between the side members of the cage and journalled in each of them, a crank on said stub shaft, and a gear mounted on said cranks for bodily revolution and containing openings permitting the passage of the tie members of the cage in all positions which the gear assumes during such revolution.

8. In a transmission apparatus, the combination of a driving shaft, a triple crank on said driving shaft, two members located at opposite sides of said crank respectively, a stub shaft extending between said members, a triple crank on said stub shaft similar in dimensions to the crank of the driving shaft, three inner gears mounted on said triple cranks and an outer gear coaxial with the driving shaft and having a gear surface engaging the peripheral surface of the three inner gears.

9. In transmission apparatus, the combination of three shafts arranged with their axes parallel in a common plane, a crank on each of said shafts, all of said cranks having the same throw, and a wheel mounted on said cranks for bodily revolution and consisting of two separable semi-circular parts connected together about said cranks.

10. Transmission apparatus, comprising aligned driving and driven shafts, a drum coaxial with said shafts and having an internal gear surface, a constraining member rotatably mounted on the driving shaft within said drum, an inner gear within said drum mounted for bodily revolution about the axis thereof, a clutch member fixed on the driven shaft located within the drum and adapted to engage the drum and constraining member alternately, a second clutch member located within the drum and adapted to engage the drum and constraining member alternately, means located outside the drum for restraining the second clutch member against rotation, and means located outside the drum for operating the clutch members.

11. In a transmission apparatus having cooperating inner and outer gears, a constraining member for the inner gear, and a driven shaft the combination of clutch members located on opposite sides of the outer gear, means connecting one of said clutch members with the driven shaft, means for holding the other of said clutch members against rotation, and means for moving the outer gear axially for alternate engagement with said clutch members.

12. A transmission device, comprising an outer gear having an engaging surface at each side thereof, a revolving inner gear, a constraining member for the inner gear having an engaging surface at each side thereof, a driven shaft, two clutch members extending between the engaging surfaces of the outer gear and constraining members at opposite sides of the outer gear, means connecting one of said clutch members with the driven shaft, means holding the other of said clutch members against rotation, and means for moving the outer gear and the engaging member axially at the same time to bring them alternately into engagement with said clutch members.

13. Transmission apparatus, comprising inner and outer gears having cooperating external and internal friction surfaces, a driving shaft coaxial with the outer gear, a cylindrical member eccentrically carried by said driving shaft, a loose connection between said cylindrical member and the inner gear transmitting to the inner gear a revolving movement about the axis of the outer gear and leaving the inner gear free to move outwardly until constrained by contact between its friction surface and the outer gear, means for counterbalancing the centrifugal force of the inner gear about the axis of the outer gear, and driven means actuated by the relative rotational movement of the gears.

14. The combination of rotating driving and driven members and means transmitting motion between said members, comprising concentric axially spaced cylindrical gear surfaces, parallel inner gears arranged to roll on said surfaces, and mountings for said inner gears permitting them to be thrown outwardly by centrifugal force against said surfaces during the rotation of said members, said inner gears and mountings being so arranged that the centrifugal effect of one inner gear is counterbalanced by that of another such gear.

15. In transmission apparatus, the combination of an outer gear, a plurality of parallel inner gears, a constraining member having parts located at opposite sides of the inner gear, and a plurality of members connecting each of the inner gears with said parts of the constraining member, each of said members being arranged positively to constrain a point of each of the inner gears to move in a circle.

In testimony whereof I have hereunto set my hand.

JOHN J. O. RULIANCICH.